Jan. 24, 1961  G. R. CURTIS  2,969,514
DIFFERENTIAL TRANSDUCER
Filed July 1, 1957  4 Sheets-Sheet 1

INVENTOR.
GERALD R. CURTIS
BY
ATTORNEYS

Jan. 24, 1961  G. R. CURTIS  2,969,514
DIFFERENTIAL TRANSDUCER
Filed July 1, 1957  4 Sheets-Sheet 2

INVENTOR.
GERALD R. CURTIS
BY
ATTORNEYS

Jan. 24, 1961

G. R. CURTIS 2,969,514

DIFFERENTIAL TRANSDUCER

Filed July 1, 1957

INVENTOR.
GERALD R. CURTIS

BY

ATTORNEYS

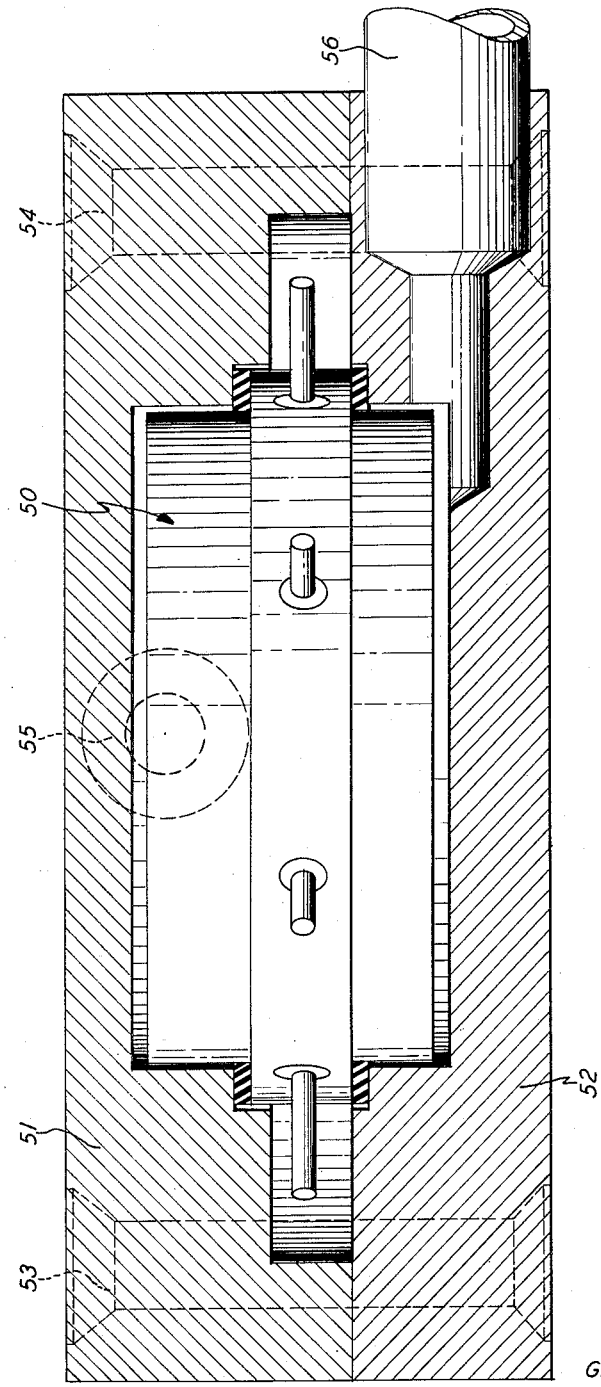

United States Patent Office

2,969,514
Patented Jan. 24, 1961

1

2,969,514

DIFFERENTIAL TRANSDUCER

Gerald R. Curtis, Duarte, Calif., assignor, by mesne assignments, to Consolidated Electrodynamics Corporation, Pasadena, Calif., a corporation of California Filed July 1, 1957, Ser. No. 669,066

2 Claims. (Cl. 338—4)

This invention relates to transducers and particularly to a differential electrical mechanical transducer for measuring simultaneously occurring differences in physical parameters such as, for example, pressure.

This application is a continuation-in-part of the application filed December 20, 1956, Serial No. 629,661, now Patent No. 2,886,678.

In the measurement of physical conditions, electrical mechanical transducers are frequently employed. One embodiment of such a device incorporates a force sensing element mounted in a sealed housing in a manner such that the element is connected by a rod to a single force summing means or diaphragm. The term "diaphragm" as used relates to a membrane deformable by forces acting against it. Movements of the diaphragm caused by force variations are transmitted by the force rod to the force sensing element. Responses of the force sensing element to the force variations enable measurement of such variations. An example of a force sensing element used in electrical mechanical transducers is a strain sensitive wire suspended in a manner such that the strain imposed on the wire is responsive to variations in the parameter of interest. Accurate measurements of the resistance change in the wire, achieved by placing the wire or wires as one or more arms of a conventional electrical bridge network, are used to ascertain the value of the force variations.

Such an embodiment of a transducer provides several advantages for measurement of any parameter which can be expressed as a force. It is small, light-weight and rugged and is characterized by a high degree of linearity and a minimum sensitivity to force fields originating from other than the parameter of interest.

A single diaphragm transducer is not however suitable in all instances where it is desired to measure the differential of forces in two different regions. With this device, such use requires that the fluid from one region be admitted within the housing of the transducer so as to exert a force against the diaphragm from within, while the fluid from the other region acts against the exterior of the diaphragm. While measurement of the differential force is obtained, there arise certain disadvantages as a result of the utilization of a transducer in this manner. First, since some fluids, such as those corrosive in nature, may deteriorate the elements within the transducer housing and other fluids, such as those electrically conductive, may adversely affect the measurements, differential measurements cannot be made with all fluids. Second, an unequal dynamic response is obtained as high frequency variations of the parameter of interest occur in

2 the two regions. My invention overcomes both of these disadvantages.

My invention is a differential transducer for measuring the difference between two simultaneously imposed forces. The differential transducer comprises two force summing devices joined to opposite ends of a housing. Each of the force summing devices or diaphragms is positioned so that it is acted upon by a separate one of the two forces. Means are provided to connect each of the force summing devices to a force sensing device located within the housing. The force sensing device is actuated in response to the displacement of the force summing devices resultant from the difference of the two forces each separately acting on one of the force summing devices.

Through the use of two diaphragms, a matched dynamic frequency response is attained when differential forces are measured. This enables accurate measurement of rapidly fluctuating variations in forces. In addition, the fluids from each region of interest act against only the exterior of the diaphragms and do not enter the housing so that differential measurements may be made where corrosive fluids are involved. My invention retains the advantages of small size, ruggedness and lightness of electrical mechanical transducers and also makes possible an accurate measurement of differential force.

The differential transducer of this invention and its manner of use will be more clearly understood from the following detailed description taken in conjunction with the accompanying drawings, in which:

Fig. 5 shows the manner in which a differential transducer may be mounted in an adapter so that fluids from two different regions may act against the exteriors of the diaphragms.

Figure 1:
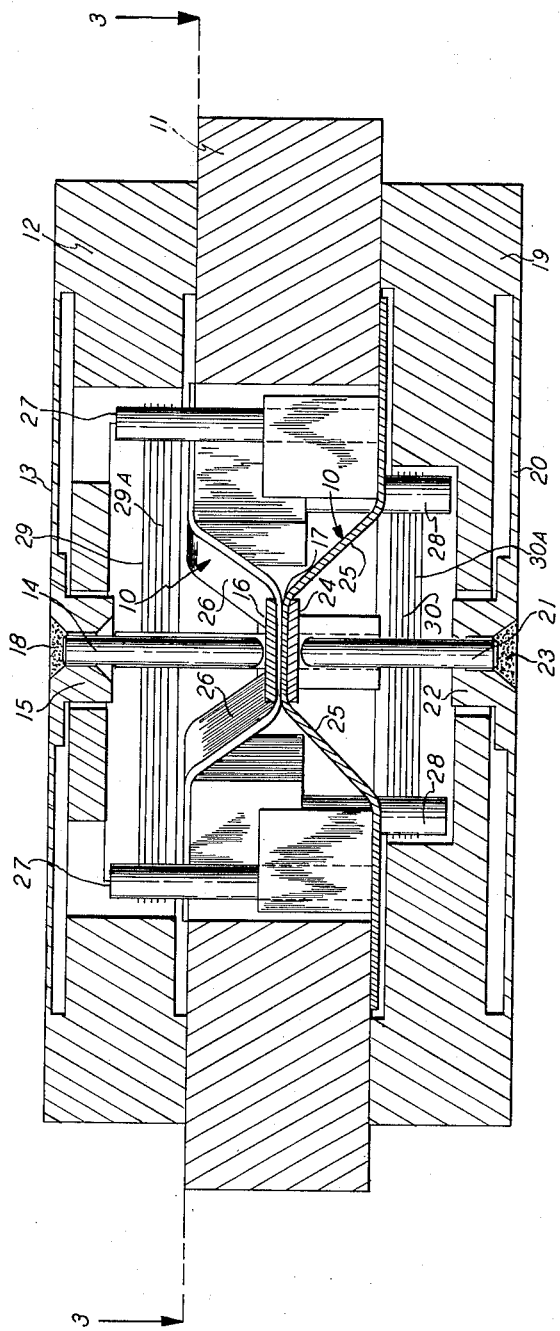
Fig. 1 is a sectional elevation of a differential transducer in accordance with the invention embodying one type of force sensing element, taken along line 1—1 of Fig. 3.
Figure 3:
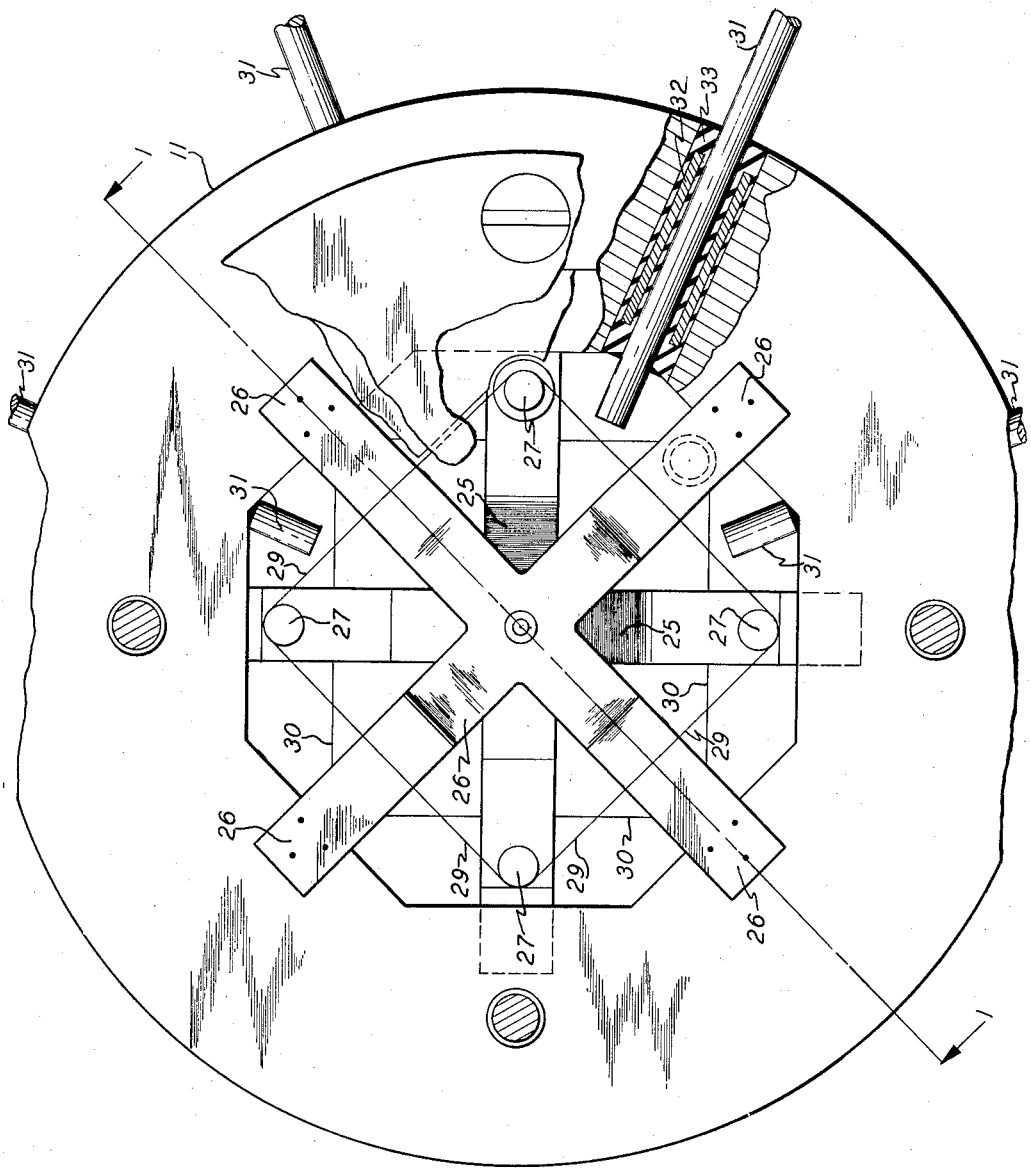
Fig. 3 is a view taken on lines 3—3 of Fig. 1, partially cut away.

With reference to Figs. 1 and 3, a differential transducer is shown in sectional elevation and plan views where the transducer is used as a pressure measuring means. A flexible flat spring device 10 is shown as an example of a symmetrical force sensing element employing a strain sensitive wire. A truly matched dynamic response can be best attained in differential measurements through the use of a symmetrical or balanced force sensing element.

A cylindrical housing 11 is joined on one end to a cylindrical cover 12 incorporating a diaphragm 13 as an integral part of the cover. While a single piece, the cover is stepped to form three coaxial cylinders covered on the end by the diaphragm. As another form of construction, the diaphragm may be made separately and joined to the cover by suitable means.

A force rod 14 is threaded to a hub portion 15 of the diaphragm and extends from the diaphragm to a steel pad 16 joined to the flexible flat spring device at the crossing point 17 of the flexible flat spring members.

The force rod fits tightly against the steel pad. A cementing compound is added at the inset 18 to insure a leak-proof seal where the force rod is threaded to the hub of the diaphragm.

A cylindrical cover 19 of the same design as cover 12 and incorporating a diaphragm 20 is joined to the other end of the housing. In the manner described above, a force rod 21, threaded to a hub portion 22 of the diaphragm 20 and cemented at an inset 23, extends from the diaphragm to a steel pad 24 so as to fit tightly against the steel pad. Both steel pads 16 and 24 are joined to the flexible flat spring device on opposite sides at the crossing point of the flexible flat spring members. Since each force rod presses from opposed sides against a common point of the flexible flat spring device, the two force rods act as a single element in the transmission of force. While the use of the two force rods in the manner described offers constructional advantages, a single force rod extending through and cemented at the central portion of the flexible flat spring device and joined at each longitudinal end to a diaphragm, may also be used for the transmission of force.

The flexible flat spring device 10 is used as an example of a force sensing element connected together so as to be in balance. This force sensing device was fully described in my copending application, Serial No. 629,661, filed December 20, 1956, now Patent No. 2,886,678, and only so much will be described as is deemed necessary for a proper understanding of this invention.

Figure 2:
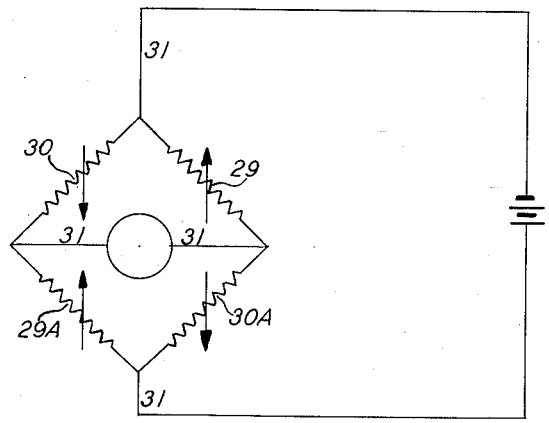
Fig. 2 is a simple circuit diagram showing the circuitry normally employed in conjunction with the transducer shown in Fig. 1.

A flexible flat spring member 25 and a flexible flat spring member 26, each member having four arms, are mounted in a crisscross fashion with ends of the arms of each member fixed to the housing. On each arm between the crossing point of the flexible members and the fixed point of the arm, insulated posts 27 are mounted on one flexible flat spring member to extend upwardly. At the same location upon each arm of the other flexible flat spring member, insulated posts 28 are mounted to extend downwardly. Bifilar strain sensitive wires 29 and 29A are wound under tension on the posts 27 and bifilar strain sensitive wires 30 and 30A are wound under tension on the posts 28. These wires are connected to provide the arms of a bridge circuit as shown in Fig. 2. In Fig. 2, wires 30 and 30A are incorporated as two active arms of the bridge circuit. Wires 29 and 29A are also incorporated as active arms to complete the four-armed bridge circuit. The lead-in and lead-out wires 31 required to form the bridge circuit are shown in Fig. 3 which is a view taken on lines 3—3 of Fig. 1. Each of the electrically conductive wires 31 are firmly attached within the housing by means of ceramic tube insulator 32 which is hermetically sealed with cement 33.

In operation, the difference of two forces each separately acting on one of the diaphragms causes a resultant displacement of the diaphragms. When this displacement is transmitted by the connecting force rods to the crossing point of the flexible flat spring members, the arms of each of the flexible members pivot about the fixed point of the arms. Therefore, the insulated posts mounted on the arms of one of the flexible members move inwardly and the insulated posts mounted on the arms of the other flexible member move outwardly with respect to the axis of the housing. The inward movement of the posts on one of the flexible members reduces the tension of the wires supported by the posts while the outward movement of the posts on the other flexible member increases the tension of the wires supported by the posts. Change in tension changes the resistance of the wires and such change measured electrically can be used to ascertain the value of differential force.

Figure 4:
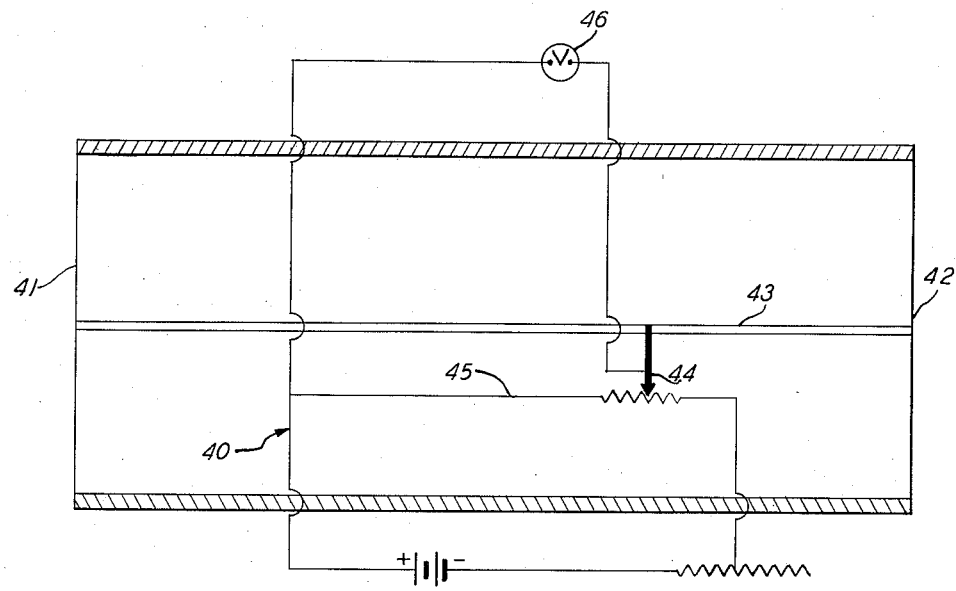
Fig. 4 is a schematic illustration of a differential transducer using another type of force sensing element.

With reference to Fig. 4, a schematic representation is provided to illustrate how a balanced force sensing device not requiring the use of strain-sensitive wires may be embodied in this invention. A potentiometer 40 is schematically shown as the force sensing device. The displacement of diaphragms 41 and 42 resultant from the difference of two forces each separately acting on one of the diaphragms causes a responsive movement of a force rod 43. This movement of the force rod moves a sliding contact 44 along a slidewire 45. The change in resistance can be measured through the use of a voltmeter 46 and the measurement used to ascertain the value of the force applied.

Fig. 5 illustrates the manner in which the differential-type transducer may be mounted in an adapter to measure pressure differentials. The transducer 50 is shown mounted in a space defined by an upper adapter member 51 and a lower adapter member 52 riveted together by rivets 53 and 54. Pressure is admitted against one diaphragm by means of the pressure inlet 55 (shown in dotted lines). Pressure is admitted against the other diaphragm through a pressure conduit 56. As previously described, the differential force exerted through the force rod provides a measurement of the difference in pressure acting against the two diaphragms. This figure illustrates why an equal dynamic response is attained at high frequency pressure variations through the use of the differential transducer of this invention. The volume adjacent to each diaphragm is equal and the entire system is symmetrical since no fluid is admitted within the housing of the transducer. These equal volumes result in equal dynamic responses as variations in force occur.

The two covers joined to opposite ends of the housing, each cover incorporating a diaphragm, form a sealed enclosure within which is positioned the force sensing means. Where the differential transducer is used as a pressure measuring means and the two pressures between which the differential is to be measured are relatively low in absolute values, the volume within the sealed enclosure is filled by a gas, such as air, or, if desired, such volume is evacuated so as to be substantially fluid-free. Where, however, the two pressures between which the differential is to be measured are high in absolute values, the volume within the sealed enclosure is filled with a substantially incompressible, electrically non-conductive, non-corrosive fluid such as oil. Since each diaphragm must be sensitive to small differential changes, its thickness is small. Therefore, the diaphragms do not possess great structural strength. Filling the sealed enclosure with an incompressible fluid such as oil provides structural support for the diaphragms without affecting their sensitivity. In this manner, the differential transducer can be used in applications where high absolute pressures are encountered.

What is claimed is:

1. A transducer for measuring the difference between two pressures comprising a substantially rigid housing, two pressure summing means mounted in the housing in spaced-apart relationship to define with the housing an enclosure, means for applying separate pressures against each of the pressure summing means exteriorly of the enclosure so that said pressures act to urge the pressure summing means toward each other, substantially rigid force transmitting means within the enclosure interconnecting the pressure summing means whereby a differential between said separate pressures produces a displacement of the force transmitting means in the direction of the lower of the two pressures without substantial deformation of the force transmitting means, and a force sensing device disposed within the enclosure and operatively connected to the force transmitting means to be actuated responsive to its displacements, thereby providing measurement of the differential between the separate pressures.

2. A transducer for measuring the difference between two pressures comprising a substantially rigid housing, two deflectable diaphragms oppositely mounted in the housing in spaced-apart relationship to define with the housing an enclosure, means for applying separate pressures against each of the diaphragms exteriorly of the enclosure so that said pressures separately act to urge the diaphragms toward each other, a substantially rigid rod within the enclosure directly interconnecting the diaphragms whereby a differential between said pressures produces a linear displacement of the rod in the direction of the lower of the two pressures, and an electrical sensing device disposed within the enclosure and operatively connected to the rod to produce an electrical signal responsive to displacements of the rod.

References Cited in the file of this patent

UNITED STATES PATENTS

| | | |
|---|---|---|
| 1,398,792 | Paulin | Nov. 29, 1921 |
| 2,060,316 | Hoesel | Nov. 10, 1936 |
| 2,600,701 | Statham | June 17, 1952 |
| 2,636,964 | Lanror | Apr. 28, 1953 |
| 2,680,376 | Shaw | June 8, 1954 |
| 2,721,919 | Li | Oct. 25, 1955 |
| 2,764,658 | Statham | Sept. 25, 1956 |
| 2,807,167 | Statham | Sept. 24, 1957 |
| 2,845,514 | Senseney | July 29, 1958 |